(12) United States Patent  
Heirich

(10) Patent No.: US 7,907,143 B2  
(45) Date of Patent: *Mar. 15, 2011

(54) INTERACTIVE DEBUGGING AND MONITORING OF SHADER PROGRAMS EXECUTING ON A GRAPHICS PROCESSOR

(75) Inventor: Alan B. Heirich, Half Moon Bay, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,796

(22) Filed: May 18, 2009

(65) Prior Publication Data

US 2009/0219288 A1 Sep. 3, 2009

Related U.S. Application Data

(63) Continuation of application No. 11/035,091, filed on Jan. 12, 2005, now Pat. No. 7,548,244.

(51) Int. Cl.
*G06F 15/80* (2006.01)
*G06F 15/00* (2006.01)
*G06F 15/16* (2006.01)
*G06T 15/50* (2006.01)
*G06T 15/60* (2006.01)
*G06T 1/00* (2006.01)

(52) U.S. Cl. .......... 345/505; 345/426; 345/501; 345/502

(58) Field of Classification Search .................. 345/426, 345/501, 502, 503, 504, 505, 506; 717/124, 717/129; 712/227

See application file for complete search history.

(56) References Cited

U.S. PATENT DOCUMENTS

| 6,704,021 | B1 | 3/2004 | Rogers et al. | |
|---|---|---|---|---|
| 6,947,047 | B1 | 9/2005 | Moy et al. | |
| 7,400,326 | B1* | 7/2008 | Acocella et al. | 345/520 |
| 7,428,727 | B2* | 9/2008 | Alverson et al. | 717/134 |
| 2004/0008200 | A1* | 1/2004 | Naegle et al. | 345/505 |
| 2004/0012597 | A1* | 1/2004 | Zatz et al. | 345/501 |
| 2004/0012598 | A1 | 1/2004 | Zatz | |
| 2004/0189651 | A1 | 9/2004 | Zatz et al. | |
| 2005/0022062 | A1* | 1/2005 | Vorbach | 714/38 |
| 2005/0122332 | A1 | 6/2005 | Boyd et al. | |
| 2006/0055695 | A1* | 3/2006 | Abdalla et al. | 345/426 |

OTHER PUBLICATIONS

"About Shadesmith"; 2003, *Shadesmith Fragment Program Debugger Readme*, http://graphics.stanford.edu/projects/shadesmith, 3 pages.

* cited by examiner

*Primary Examiner* — Kee M Tung
*Assistant Examiner* — Jacinta Crawford
(74) *Attorney, Agent, or Firm* — Kilpatrick Stockton & Townsend LLP

(57) ABSTRACT

A development application leverages the programmability of shader execution units in the graphics processing subsystem to make graphics processing subsystem state data accessible to applications executed outside the graphics processing subsystem. The development application modifies shaders to include state output instructions adapted to direct a shader execution unit to copy graphics processing subsystem state data to a location in the computer system that is accessible to applications executed outside of the graphics processing subsystem. Following the execution of the state output instructions, the shader execution unit can be halted or can continue executing the shader. The development application can modify the shader to include state restoration instructions adapted to direct the shader execution unit to set state data of the graphics processing subsystem to previous or new values. The development application can dynamically modify shaders with state output and restoration instructions to update state data of the graphics processing subsystem.

20 Claims, 7 Drawing Sheets

INTERACTIVE DEBUGGING AND MONITORING OF SHADER PROGRAMS EXECUTING ON A GRAPHICS PROCESSOR

CROSS-REFERENCE TO RELATED CASES

The present application is a continuation application of, and claims priority to, U.S. Non-Provisional application Ser. No. 11/035,091, filed on Jan. 12, 2005, entitled "INTERACTIVE DEBUGGING AND MONITORING OF SHADER PROGRAMS EXECUTING ON A GRAPHICS PROCESSOR," which is hereby incorporated herein by reference.

BACKGROUND

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. These graphics processing subsystem programs, often referred to as shader programs or shaders, can be used to define a set of operations to be performed on object geometry, object vertices, and/or fragments, which are groups of pixels or subpixels. Despite their name, shader programs are not confined to merely implementing shading and lighting algorithms and can be used to implement a variety of graphics algorithms, including geometry generation and modification, complex animations, motion and physics simulations, lighting and shading effects, reflections and refractions, texture mapping, and procedural texture generation.

Shader programs can be written in an assembly-like language specifically tailored to architecture of the graphics processing subsystem, or high-level languages such as Pixar's RenderMan, Nvidia's Cg, Microsoft's high-level shading language (HLSL), and the OpenGL Shading Language. Although simple visual effects can be implemented with shaders having only a few instructions, more complicated shaders can include hundreds or thousands of instructions.

As developers create shaders with increasing size and complexity, tuning the performance of shaders and eliminating errors becomes more difficult. In addition to the complexity arising from the increased length of shaders, a single shader can operate on thousands or millions of geometric primitives or fragments; however, in many cases, only some of geometric primitives or fragments will manifest obvious signs of errors or poor performance. The shader developer must then try to isolate the affected primitives or fragments and their associated instances of the shader in order to identify the problem with the shader program.

Conventional debugging and profiling applications provide developers with the ability to analyze programs running on conventional CPUs. Many debugging and profiling applications enable developers to set breakpoints with a program. Program execution stops upon reaching the breakpoint. The debugger application enables developers to examine and optionally alter the values of variables and data in registers and memory, step through program execution one instruction at a time, or resume program execution. Profiling applications enable developers to identify the portions of the program that require the most time to execute.

There are several obstacles to providing similar debugging and profiling capabilities for shaders executed by a graphics processing subsystem. Graphics processing subsystems typically process rendering instructions and data in a very long processing pipeline. There may be hundreds or thousands of internal registers as well as internal memory deep within this pipeline that is typically not accessible outside of the graphics processing subsystem. This prevents debugging and profiling applications from retrieving and/or altering data in these locations. Furthermore, modifying the graphics processing subsystem to provide additional input and output connections for enabling external access to these registers and memories is often impractical if not impossible.

Additionally, graphics processing subsystems often process many fragments or primitives in parallel, each with its own instance of a shader program. Upon reaching a breakpoint in one shader program, stopping its execution while allowing other shader programs to continue can create problems with synchronization and data corruption. These problems can be exacerbated if the remaining running shader programs reach their own breakpoints while a first shader program is still stopped.

Once the developer has finished analyzing a shader program at a breakpoint, there is no way for the debugging or profiling application to restore the state of the graphics processing subsystem prior to the breakpoint and to resume normal operation. Furthermore, typical graphics processing subsystems do not have the capability to step through shader instructions one at a time, referred to as single-stepping, to enable developers to observe changes in program data values.

It is therefore desirable for a system and method to provide debugging and profiling capabilities for shader programs being executed by a graphics processing subsystem. It is further desirable for the system and method to provide these capabilities using existing resources of the graphics processing subsystem and without the need for additional data inputs and outputs. It is also desirable for the system and method to prevent conflicts and errors arising from multiple instances of shader programs executed in parallel by the graphics processing subsystem. It is desirable for the system and method to allow resuming normal execution of shader programs after a breakpoint and to enable developers to single-step through shader program instructions. It is desirable to minimize any additional performance burden on the graphics processing subsystem during debugging and profiling operations.

BRIEF SUMMARY OF THE INVENTION

An embodiment of the invention leverages the programmability of shader program execution units in the graphics processing subsystem, such as those used to process pixel fragments and, in some embodiments, vertices, to make the data in the registers and memory of the graphics processing subsystem, referred to as graphics processing subsystem state data, accessible to applications executed outside the graphics processing subsystem. This enables external applications, such as debugging and profiling applications executed by a CPU in the computer system or a connected development system, to monitor and modify graphics processing subsystem state data.

A development application modifies shader programs to include state output instructions. Upon executing the state output instructions of the modified shader program, the shader program execution unit copies state data of the graphics processing subsystem to a location in the computer system accessible to applications executed outside of the graphics processing subsystem. Following the execution of the state output instructions, the shader program execution unit can be halted or can continue executing the shader program. The development application can also modify the shader program to include state restoration instructions adapted to restore state data of the graphics processing subsystem to previous or new values. State output and state restoration instructions can be executed at any arbitrary location in the shader program. The development application can dynamically modify shader programs with state output and restoration instructions to update state data of the graphics processing subsystem as needed.

An embodiment is a method of accessing state information of a graphics processing subsystem within a first computer system. The graphics processing subsystem includes a programmable execution unit adapted to execute a shader program and the first computer system includes at least one central processing unit. In this embodiment, the method includes providing a first shader program to the graphics processing subsystem, wherein the first shader program includes at least one state output instruction; executing the first shader program including the state output instruction by the programmable execution unit of the graphics processing subsystem; and, in response to the state output instruction, transferring the state information of the graphics processing subsystem stored in a portion of the graphics processing subsystem that is inaccessible to the central processing unit of the first computer system to a portion of the first computer system that is accessible to the central processing unit.

In a further embodiment, the method further includes halting the programmable execution unit. In an additional embodiment, the method also includes halting at least one additional programmable execution unit of the graphics processing subsystem. In still another embodiment, halting at least one additional programmable execution unit includes modifying a set of rendering commands and data associated with the additional programmable execution unit such that at least one geometric primitive intended for processing by the programmable execution unit is discarded.

In an embodiment, the method includes transferring the state information from the portion of the first computer system that is accessible to the central processing unit to a development computer system. In a further embodiment, a program adapted to be executed by the central processing unit is adapted to transfer the state information to the development computer system.

In an embodiment, the method includes providing a second shader program to the graphics processing subsystem. The second shader program includes at least one state restoration instruction adapted to set the state information of the graphics processing subsystem to a predetermined state value and at least one additional instruction. This embodiment of the method also includes executing the state restoration instruction and executing an additional instruction of the second shader program. The additional instruction of the second shader program is identical to an additional instruction of the first shader program.

BRIEF DESCRIPTION OF THE DRAWINGS

The invention will be described with reference to the drawings, in which.

DETAILED DESCRIPTION OF THE INVENTION

Figure 1:
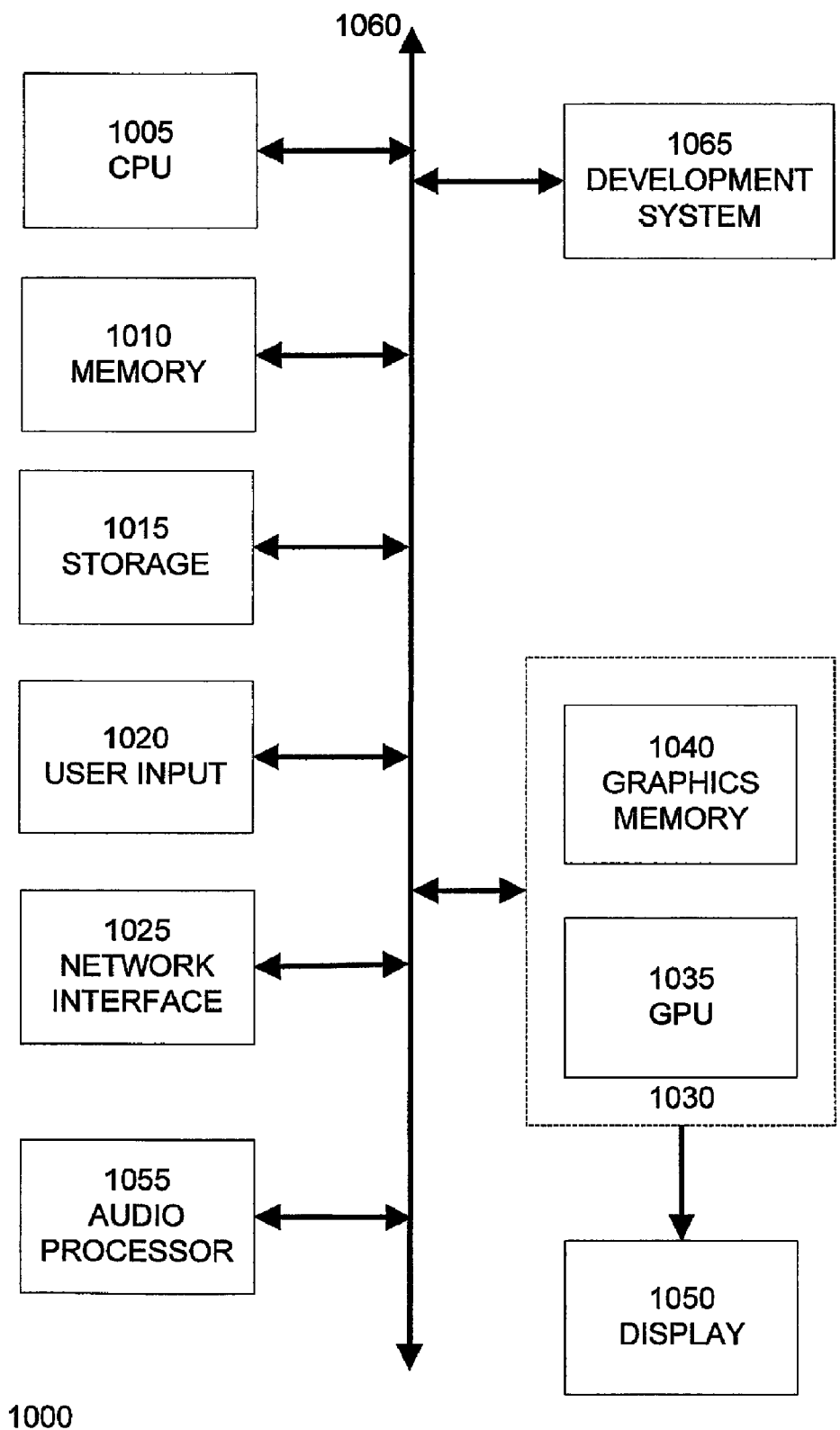
FIG. 1 is a block diagram of a computer system suitable for practicing an embodiment of the invention.

FIG. 1 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

To assist with the development of applications, computer system 1000 is further interfaced with development system 1065. Development system 1065 is an independent computer system including components of similar type as those in computer system 1000. However, the components of development system 1065 can be different in implementation than their counterparts in computer system 1000. Development system 1065 can further include software development applications adapted to assist developers in creating programs for computer system 1000. Software development applications can include text, graphics, and audio editing applications; compilers, linkers, and other programming utilities; and communications applications for transferring applications from the development system 1065 to the computer system 1000 for execution.

Figure 2:
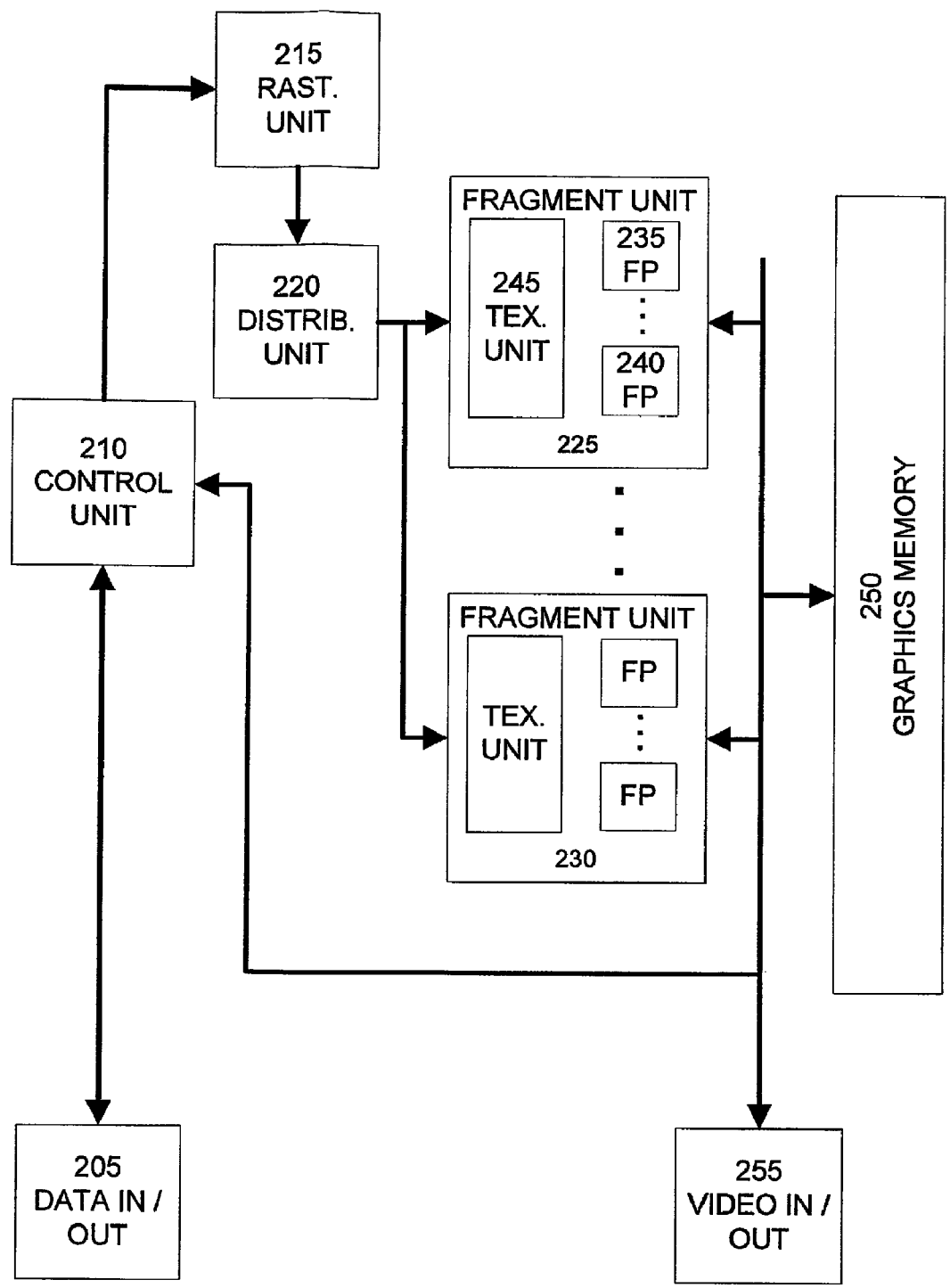
FIG. 2 is a block diagram illustrating a graphics processing subsystem suitable for practicing an embodiment of the invention.

FIG. 2 is a block diagram illustrating a graphics processing subsystem 200 suitable for practicing an embodiment of the invention. Rendering commands and data used to define the desired rendered image or images, including geometry, lighting, shading, texturing, motion, and/or camera parameters for a scene, are provided to the graphics processing subsystem 200 via interface 205. The graphics processing subsystem 200 includes a number of processing units operating in parallel. Control unit 210 supervises the operation of these processing units.

The rendering commands and data include vertices defining one or more geometric primitives to be rendered by the graphics processing subsystem 200. In an embodiment, the vertices and any associated attributes have been transformed from a three-dimensional world coordinate system to a two-dimensional screen coordinate system by a processor external to the graphics processing subsystem, such as a CPU or a specialized co-processor. In an alternate embodiment, the graphics processing subsystem 200 includes a vertex processor (not shown) adapted to transform vertices to a screen-coordinate coordinate system. In a further embodiment, the vertex processor can also include the ability to execute one or more vertex shader programs adapted to further implement a variety of visual effects, including lighting and shading operations, displacement mapping, procedural geometry, and animation operations.

The transformed vertices are passed to the rasterization unit 215. The rasterization unit 215 assembles one or more vertices into a geometric primitive, such as a point, line, triangle, or quadrilateral. The rasterization unit 215 then converts each geometric primitive into one or more pixel fragments. A pixel fragment defines a set of one or more pixels to be potentially displayed in the rendered image: Each pixel fragment includes parameters for updating its associated set of pixels, for example screen position, texture coordinates, color values, normal vectors, and/or user-defined parameters.

The pixel fragments are then passed from the rasterization unit 215 to a distributor unit 220. Distributor unit 220 assigns pixel fragments to be processed by one of a plurality of fragment processing units, such as fragment processing units 225 and 230. Although two fragment processing units are shown in FIG. 2, this number is intended for illustration only and graphics processing subsystem 200 can include any arbitrary number of fragment processing units. Distributor unit 220 assigns pixel fragments to fragment processing units in such as manner as to balance the fragment processing burden as evenly as possible over the available fragment processing units. In an embodiment, distributor unit 220 assigns pixel fragments to fragment processing units in accordance with each fragment's position in the screen space coordinate system. In this embodiment, each fragment processing unit is associated with a region of the screen and receives pixel fragments falling within these regions from the distributor unit 220.

Each of the plurality of fragment processing units, such as unit 225, include one or more fragment processors. In FIG. 2, fragment processing unit 225 includes two fragment processors 235 and 240; however, number is intended for illustration only and graphics processing subsystem 200 can include any arbitrary number of fragment processors in each fragment processing unit. Each fragment processor, such as fragment processor 235, uses the information associated with each pixel fragment to determine the output color and/or other parameter values of each pixel to be potentially displayed.

In an embodiment, the fragment processor determines the value of each pixel by executing a shader program. The output of the shader program may be dependent upon parameters associated with the pixel fragment, such as screen position, texture coordinates, color values, normal vectors, and/or user-defined parameters. Shader programs can be used to implement a variety of visual effects, including lighting and shading effects, reflections, texture mapping and procedural texture generation. Additionally, both shader programs can be employed for non-visual purposes such as general purpose computation, image processing, and signal processing.

To assist in executing shader programs, each fragment processor can include a number of computational units adapted to perform a variety of programmable functions, including scalar and/or vector arithmetic functions, logic or Boolean functions, comparison functions, and program flow functions, such as conditional and non-conditional branching. Additionally, an embodiment of a fragment processor includes a number of registers adapted to store shader program data during the processing of one or more pixel fragments. Furthermore, an embodiment of a fragment processor is adapted to store and retrieve data from a stack data structure.

Fragment processors store the output color and/or other parameters associated with each pixel fragment, such as depth or transparency, in a frame buffer memory. In an embodiment, all or a portion of the frame buffer memory is in graphics memory 250. Graphics memory 250 can be integrated in the same device as the graphics processing subsystem 200 or exist as a separate device. As pixel fragment output data is stored in the frame buffer memory, it may be combined or blended with output data associated with previously processed pixel fragments.

For texture mapping operations, which generally retrieve one or more data values from a location in an array specified by one or more texture coordinates, a texture unit, such as texture unit 245, is employed. In an embodiment, each fragment processing unit includes it own similarly configured texture unit. Texture unit 245 is interfaced with each of the fragment processors in fragment unit 225. Texture unit 245 receives texture requests from its associated fragment processors. The texture requests include a texture identification and texture coordinates. Texture unit 245 retrieves texture data corresponding to a texture request from graphics memory 250 and returns it to the requesting fragment processor.

When the graphics processing subsystem has completed processing of all of the primitives associated with an image, the image can be read from the frame buffer memory, converted to a video output signal by video out unit 255, and output to a display device.

Unlike typical general purpose CPUs, in which data in registers and memory are accessible to debugging and profiling applications, the data in the registers and memory of graphics processing subsystem, such as that stored in fragment processor registers while executing shader programs, often cannot be accessed by external applications, such as debugging and profiling application executed by a CPU in the computer system or in a connected development system. An embodiment of the invention leverages the programmability of shader execution units in the graphics processing subsystem, such as those used to process pixel fragments and, in some embodiments, vertices, to make the data in the registers and memory of the graphics processing subsystem, referred to as graphics processing subsystem state data, accessible to applications executed outside the graphics processing subsystem. This enables external applications, such as debugging and profiling applications executed by a CPU in the computer system or a connected development system, to monitor and modify graphics processing subsystem state data.

Figure 3:
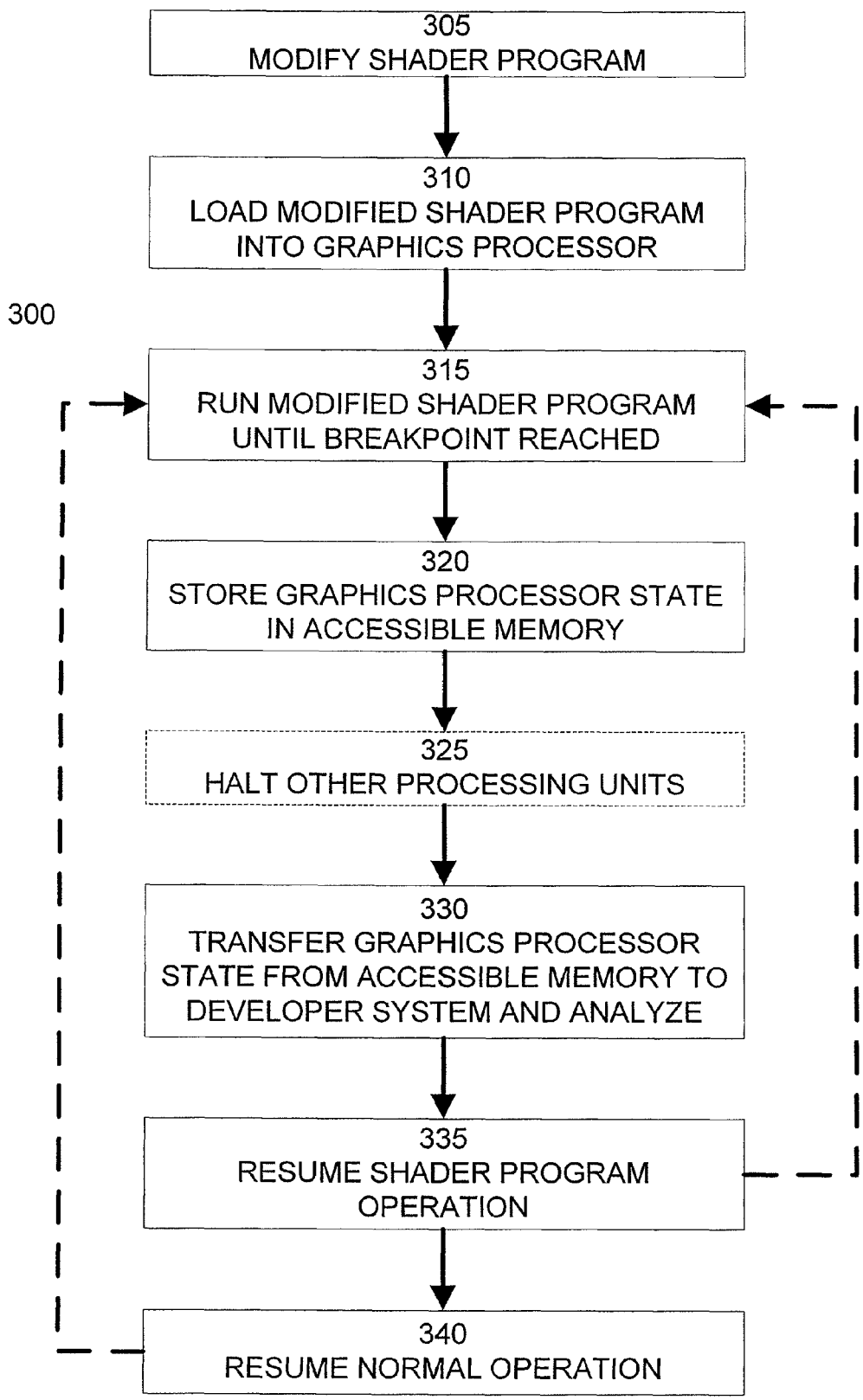
FIG. 3 is a flowchart illustrating a method of providing external applications with access to graphics processing subsystem state information according to an embodiment of the invention.

FIG. 3 is a flowchart illustrating a method 300 of providing external applications with access to graphics processing subsystem state information according to an embodiment of the invention. At step 305, a developer or other user selects one or more shader programs for analysis. In an embodiment, shader programs are selected for analysis using a development software application executed on a development system. The development system is in communication with a computer system that includes a graphics processing subsystem adapted to execute shader programs. In an embodiment, the developer also selects graphics processing subsystem state data to be monitored, such as one or more variables of the selected shader program, registers of a fragment processor, and/or memory locations. In a further embodiment, the developer sets one or more breakpoints, which are locations in the selected shader program in which the selected state data is to be made available during shader program execution.

In response to the selection of a shader program for analysis, the selection of state data, and the specification of one or more breakpoints, the selected shader program is modified by the development software application. In an embodiment, the development software application adds a set of new instructions, referred to as state output instructions, to the shader program. The state output instructions are adapted to instruct the shader execution unit to transfer copies of the selected state data out of the graphics processing subsystem. In an embodiment, the state output instructions, or a reference thereto, are located in the shader program at a location corresponding to the location of the specified breakpoint.

In a further embodiment, the state output instructions includes an instruction to stop the operation of the fragment processor after the state data has been transferred out of the graphics processing subsystem. This embodiment is useful for debugging shader programs. In another embodiment, the state output instructions includes an instruction for resuming normal execution of the shader program. This embodiment is useful for profiling, monitoring, or performance tuning applications. In the case of the latter embodiment, if any state data destroyed while being transferred out of the graphics processing subsystem, a further embodiment of the state output instructions include further instructions for restoring this state data prior to resuming normal execution of the shader program.

Once step 305 has modified one or more shader programs with state output instructions in accordance with the developer's specifications, step 310 loads the modified shader program into the graphics processing subsystem for execution. In an embodiment, step 310 loads the modified shader programs into the graphics processing subsystem in the same manner as that is used for normal unmodified shader programs. The technique used to load shader programs into the graphics processing subsystem for execution will vary depending upon the specific architecture of the computer system and the graphics processing subsystem; however, in general, any technique for transferring data between components of a computer system known to one of skill in the art can be used.

In step 315, the graphics processing subsystem executes one or more shader programs, including shader programs modified with state output instructions, in conjunction with rendering commands and data. In an embodiment, rendering commands and data are provided to the graphics processing subsystem by a CPU in the computer system executing an application program.

In step 320, upon reaching a breakpoint in a modified shader program, a fragment processor executes the state output instructions included in the modified shader program. As a result, the shader program execution unit, such as a fragment processor, transfers a copy of the state data from its location within the graphics processing subsystem, such as from one or more data registers, stack locations, or memory locations, to an externally accessible location. In an embodiment, a copy of the state data is transferred from the graphics processing subsystem to the system memory of the computer system. The shader program execution unit can transfer state data directly or employ any data transfer technique well known in the art, such as using direct memory access (DMA) operations.

Following the output of state data to an externally accessible location, the computer system detects the presence of the copy of state data in this location. In an embodiment, the development software application specifies the address of the externally accessible location when modifying the shader program with state output instructions. The development system then monitors this address for changes to detect the presence of the state data from the graphics processing subsystem. In a further embodiment, the externally accessible location, such as the system memory of the computer system, is only accessible to the CPU and is not directly accessible by the development system. In this embodiment, the development software application modifies the application to be executed by the CPU so that the CPU monitors the address used to store a copy of the state data.

As discussed above, an embodiment of the state output instructions include an instruction for stopping the operation of the fragment processor after outputting a copy of the state data. However, many graphics processing subsystems have multiple fragment processors or other shader program execution units. In order to prevent problems associated with stopping the execution of one shader program, such as another execution unit reaching a breakpoint, optional step 325 halts the other shader program execution units in the graphics processing subsystem. Step 325 may be bypassed if the shader program automatically resumes normal operation after the execution of the state output instructions as discussed above.

In an embodiment, step 325 halts other shader program execution units by sending an instruction to the each of the other shader program execution units. In another embodiment, the rendering data sent to the graphics processing subsystem is modified to halt the other shader program execution units. For example, the values of vertices of geometric primitives to be processed by other fragment processors are changed so that these geometric primitives are located off-screen and are clipped or discarded. Alternatively, the clipping window is changed so that geometric primitives that would normally be processed by the other fragment processors are instead clipped. Other modifications of rendering data can also be done to accomplish this effect. In a further embodiment, only the values of the rendering data are changed and no rendering commands or data are removed, so as to prevent problems associated with data alignment and relative addressing. As a result of this modification of rendering data, no geometric primitives are sent to the other fragment processors and their execution is essentially halted.

If the development system cannot access the copy of the state data directly, optional step 330 transfers the copy of the state data from its externally accessible location to the development system. In an embodiment, this is accomplished using the application executing on the CPU of the computer system. In this embodiment, the application executed by the CPU is modified by the development software application so that the CPU reads the state data from its externally accessible location and communicates it with the development system via a communications interface.

If the graphics processing subsystem has been halted by the state output instructions, the execution of shader programs will remain suspended until the developer instructs the graphics processing subsystem to resume operation. During this period of suspended execution of step 330, the developer can analyze the state data. In a further embodiment, the developer can use the development software application to modify the state data and/or set or remove breakpoints from the shader program.

In an embodiment of step 330, the development software application modifies the shader program with state restoration instructions adapted to restore the previous state data values that may have been previously destroyed or new state data values specified by the developer. Additionally, if the developer removes a breakpoint, then the development software application removes the corresponding state output instructions and any associated references thereto. Conversely, if the developer adds a breakpoint, then the development software modifies the shader program with a corresponding set of state output instructions. The development software application may include a single-stepping capability that enables developers to halt the shader program after each instruction following a breakpoint. In an embodiment, the single-stepping capability is enable by automatically removing the current breakpoint and setting a new breakpoint after next instruction.

If the shader program has been further modified by step 330, either due the addition of state restoration instructions or the addition or remove of state output instructions, step 330 loads the further modified shader program into the graphics processing subsystem in a manner similar to that discussed above in step 310.

Following step 330, step 335 resumes shader program operation. If any state data has been destroyed while being transferred out of the graphics processing subsystem or the developer modifies the value of state data, then step 335 restores the graphics processing subsystem state. In an embodiment, step 335 resumes shader program operation by specifying a program starting address in the shader program corresponding with the start of the set of state restoration instructions. Following the execution of the state restoration instructions, the data registers, stack, and memory will have the appropriate values. In an embodiment, the end of the state restoration instructions include an instruction for resuming execution with the next instruction following the most recent breakpoint executed. Similarly, if the developer adds or removes breakpoints from the shader program and there is no need to execute state restoration instructions, step 335 resumes shader program operation by specifying a program starting address in the shader program corresponding to the next instruction following the most recent breakpoint executed.

In an embodiment, the developer can specify two types of shader program resumption. In the first type, only the shader program with the most recently triggered breakpoint is resumed. Other shader program execution units, such as other fragment processors, remain halted. In this type of shader program resumption, method 300 returns to step 315 to execute the shader program until the next breakpoint is reached. If the other shader program execution units remain halted, step 325 may be bypassed. Steps 320 and 330 are further repeated to analyze additional state data.

In the second type of shader program resumption, the developer specifies that all shader program execution units are to resume operation. In this type, following step 335, step 340 further restarts the other halted shader program execution units. In an embodiment, this is performed by sending an instruction to the other shader program execution units. In another embodiment, the other shader program execution units are restarted by restoring the values of their rendering data, so that geometric primitives are no longer clipped and are instead normally processed by the other fragment processors. In a further embodiment, a "snapshot" of rendering commands and data is saved by the developer prior to the activation of a breakpoint, so that the original values of the rendering commands and data can be restored in step 340. Following step 340, method 300 proceeds to step 315 to execute one or more shader programs until the another breakpoint, if any still exist, is reached.

Figure 4:
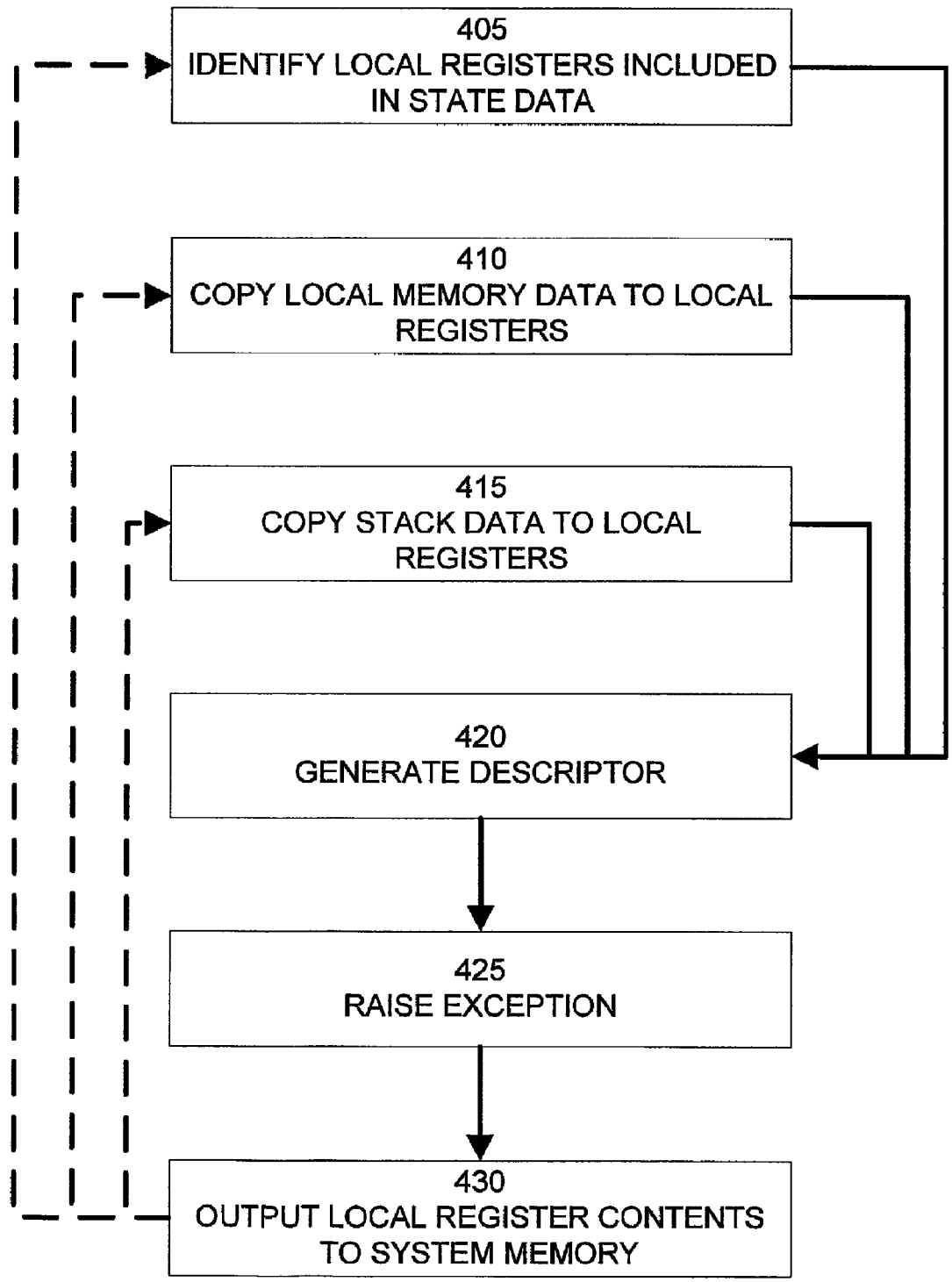
FIG. 4 is a flowchart illustrating a method of making state information of a graphics processing subsystem accessible according to an embodiment of the invention.

FIG. 4 is a flowchart illustrating a method 400 of making state information of a graphics processing subsystem accessible according to an embodiment of the invention. In an embodiment, method 400 can be implemented by a set of state output instructions in a shader program modified as discussed above. If the developer has selected one or more registers to be included in the state data, or if the developer has selected one or more shader program variables that a shader language compiler has assigned to one or more registers, then step 405 identifies at least a portion of the registers to be included in the state data and proceeds to step 420. Step 420 generates a descriptor specifying a set of one or more registers having values to be transferred out of the graphics processing subsystem.

Step 425 raises a shader program execution unit exception, interrupt, or other type of intra-system communication signal. In response to the exception, in step 430 the control unit 210 or another portion of the graphics processing subsystem retrieves the descriptor, reads the contents of the data registers specified by the descriptor, and copies their values to an externally accessible location.

Following step 430, method 400 proceeds back to step 405 to determine if the values of any more registers need to be output. This can occur if the graphics processing subsystem has limitations on the transfer of data between shader program execution units, such as fragment processors, and the control unit 210. If the values of any more registers need to be output, then method 400 returns to step 420. Steps 405, 420, 425, and 430 may be repeated as needed to output all of the values of registers requested by the developer.

Once all of the values of registers requested by the developer have been copied to an externally accessible location, step 410 determines if any values from memory, such as graphics memory 250, are included in the state data. If the state data includes memory values, then step 410 copies the values from memory to one or more registers. In doing so, step 410 may overwrite the values previously stored in these registers. If these registers were used during shader program execution, then their original values must be restored upon shader program resumption, as discussed above. Following step 410, steps 420 through 430 are repeated to copy memory values from registers to an externally accessible location. To overcome the limits, if any, on the transfer of data between registers and the control unit 210, steps 410, 420, 425, and 430 may be repeated as needed to output all of the values of memory requested by the developer.

Once all of the values of memory requested by the developer have been copied to an externally accessible location, step 415 determines if any values from the stack, are included in the state data. If the state data includes stack values, then step 415 copies the values from the stack to one or more registers. In an embodiment, this is done using a stack popping operation. In doing so, step 415 may overwrite the values previously stored in these registers. If these registers were used during shader program execution, then their original values must be restored upon shader program resumption, as discussed above. Following step 415, steps 420 through 430 are repeated to copy stack values from registers to an externally accessible location. To overcome the limits, if any, on the transfer of data between registers and the control unit 210, steps 410, 420, 425, and 430 may be repeated as needed to output all of the values of the stack requested by the developer. In alternate embodiments, steps 410 and 415 can be performed in opposite order, or bypassed if the control unit 210 can read values from memory and/or the stack directly.

Figure 5:
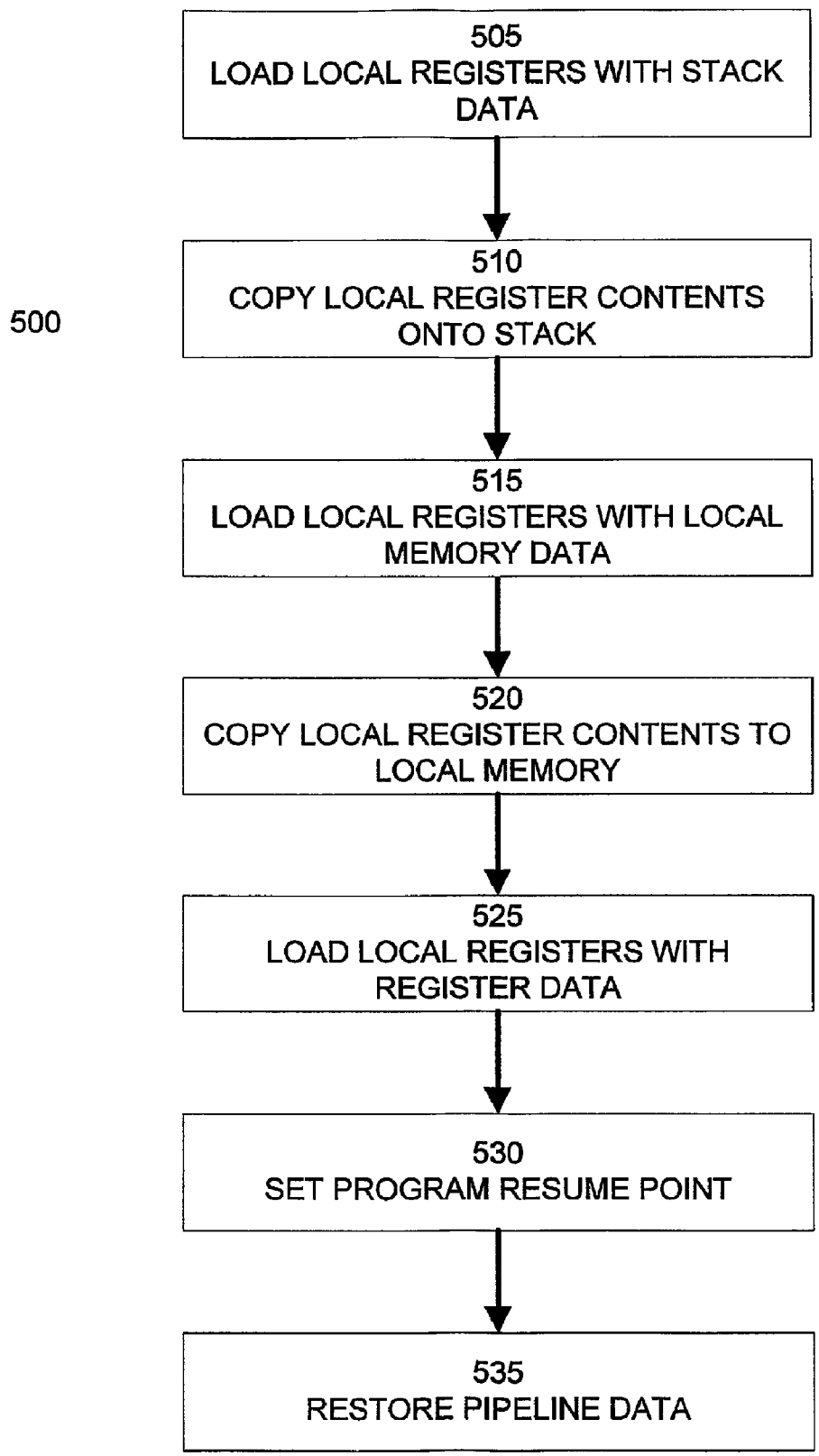
FIG. 5 is a flowchart illustrating a method of resuming the execution of shader programs in a graphics processing subsystem according to an embodiment of the invention.

FIG. 5 is a flowchart illustrating a method 500 of resuming the execution of shader programs in a graphics processing subsystem according to an embodiment of the invention. In an embodiment, all or a portion of method 500 can be implemented by a set of state restoration instructions included in a shader program modified as discussed above. In step 505, stack data to be restored, if any, is loaded into the data registers of the shader program execution unit. In step 510, these values are copied from the data registers to the stack. In an embodiment, a stack push operation is used to load the stack. Steps 505 and 510 can be repeated as necessary if the number of stack values to be loaded exceeds the number of available registers.

Similarly, step 515 loads memory data to be restored, if any, into the data registers of the shader program execution unit. Step 520 copies the memory data from the data registers to the memory at the appropriate location. In an embodiment, the state restoration instructions specify the locations in memory for the memory data. Steps 515 and 520 can be repeated as necessary if the number of memory data values to be loaded exceeds the number of available registers.

Step 525 loads register data to be restored, if any, into the data registers of the shader program execution unit. In an embodiment, rather than recomputing the values of the stack, memory, and registers in their previous state by re-executing the portions of the shader program, steps 505, 515, and 525 can use instructions such as the common assembly language instruction "Load immediate value" or its equivalents to directly load the appropriate values into registers. The values loaded by these types of instruction can come from the development software application, which has a copy of the previous state data as well as any values modified by the developer. The development software application can modify the shader program so that the state restoration instructions include the correct values. For the stack data, an embodiment of the development software application sequences stack push operations in the state restoration instructions to place data on the stack in the correct order. For the memory data values, an embodiment of development application software includes the memory addresses associated with the memory data in the state restoration instructions.

Following step 525, step 530 sets a shader program resume point. In an embodiment, the program resume point is the address of the next shader program instruction following the most-recently executed breakpoint.

In a further embodiment, the graphics processing pipeline includes other intermediate values that must be reinitialized prior to resuming normal operation of the shader program. In an embodiment, step 535 restores the graphics processing pipeline data by resending the sequence of rendering commands and data to the graphics processing subsystem, starting with the last geometric primitive processed by the shader program execution unit.

The texture unit can include registers that need to be re-initialized prior to resumption of normal operation of the shader program. In an embodiment, the developer software application creates an artificial texture map including the values needed to be restored in texture unit, and includes a texture request instruction in the state restoration instructions to retrieve data from this artificial texture map, thereby loading the registers of the texture unit with the correct data. In an alternate embodiment, this re-initialization of the texture unit can be bypassed if shader programs follow a convention of always copying texture data from the texture unit to one of the shader program execution unit's registers prior to using the texture data. In this embodiment, texture data is automatically preserved and restored in the same manner as the data values of the other data registers.

Figure 6:
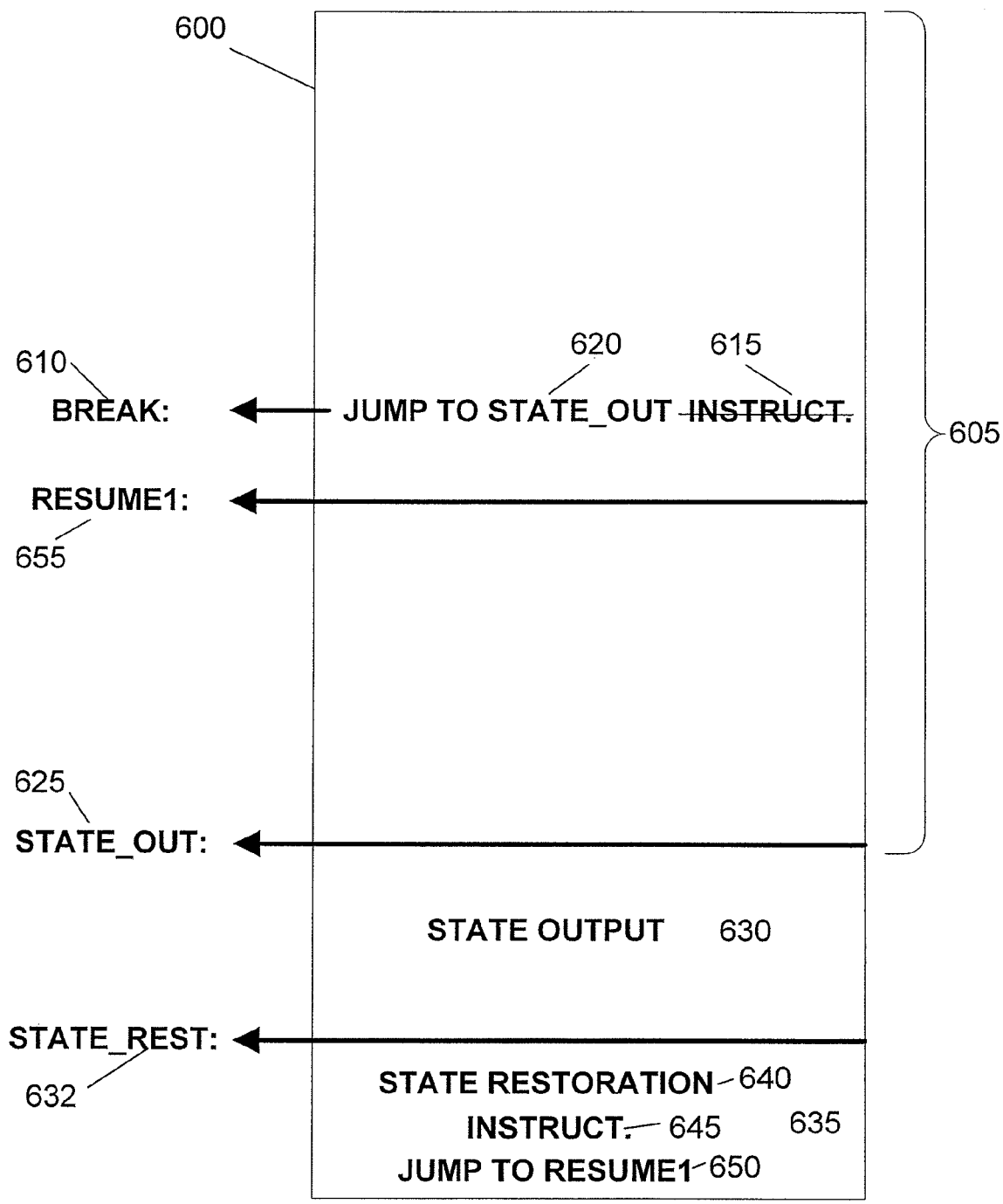
FIG. 6 illustrates a block diagram of a shader program modified according to an embodiment of the invention.

FIG. 6 illustrates a block diagram of a shader program 600 modified according to an embodiment of the invention. Shader program 600 includes a main program block 605. In an embodiment, main program block 605 includes all of the instructions of the unmodified shader program, with the exception of any instructions displaced by the introduction of breakpoints.

Shader program 600 include a breakpoint at location 610. In an embodiment, the instruction at location 610 in the unmodified shader program, instruction 615, has been deleted by the development software application and replaced with a reference 620 to a set of state output instructions. In this embodiment, instruction 615 has been replaced with reference 620 so that the length of the main program block 605 and any associated relative addressing remains unchanged. An example of a reference 620 is a jump instruction to the beginning of the state output instructions. In a further embodiment, if the developer has specified a conditional breakpoint, which a breakpoint that is only executed if a certain condition is satisfied, then reference 620 can be a conditional jump instruction.

Upon reaching location 610 during the shader program execution, the shader program execution unit jumps to location 625, which is the beginning of the state output instructions 630. State output instructions transfer state data specified by the developer to a externally accessible location, as discussed above. In an embodiment, shader program execution is halted at the completion of the state output instructions 630. In an alternate embodiment, shader program execution continues automatically at the completion of the state output instructions 630, either by jumping to the instruction immediately following breakpoint 610, at location 655, or if necessary executing state restoration instructions 635 to restore any state data destroyed during by state output instructions 630. In the case of the former, state output instructions 630 should include a copy of the deleted instruction 615 to be executed prior to jumping to location 655 to ensure proper shader program execution.

Upon resuming shader program execution, the shader program execution unit begins execution at location 632, which is the beginning of the state restoration instructions 635. State restoration instructions 635 include instructions 640 for restoring state values destroyed by state output instructions 630. State restoration instructions 635 also include instruction 645, which is a copy of deleted instruction 615. Following instruction 645, a jump instruction 650 returns the shader program execution unit to location 655, which is the instruction immediately following the breakpoint.

In some graphics processing subsystems, the shader program execution units have limitations on the total length of shader programs and/or the distance or number of instructions that a jump instruction can move the program forward or backwards. In an embodiment, the development software application compensates for these limitations during compilation, for example by placing state output instructions or state restoration instructions in the middle, rather than the end of main program block 605. As a result, the development software application may need to recompile the modified shader program to ensure proper relative addressing.

Figure 7:
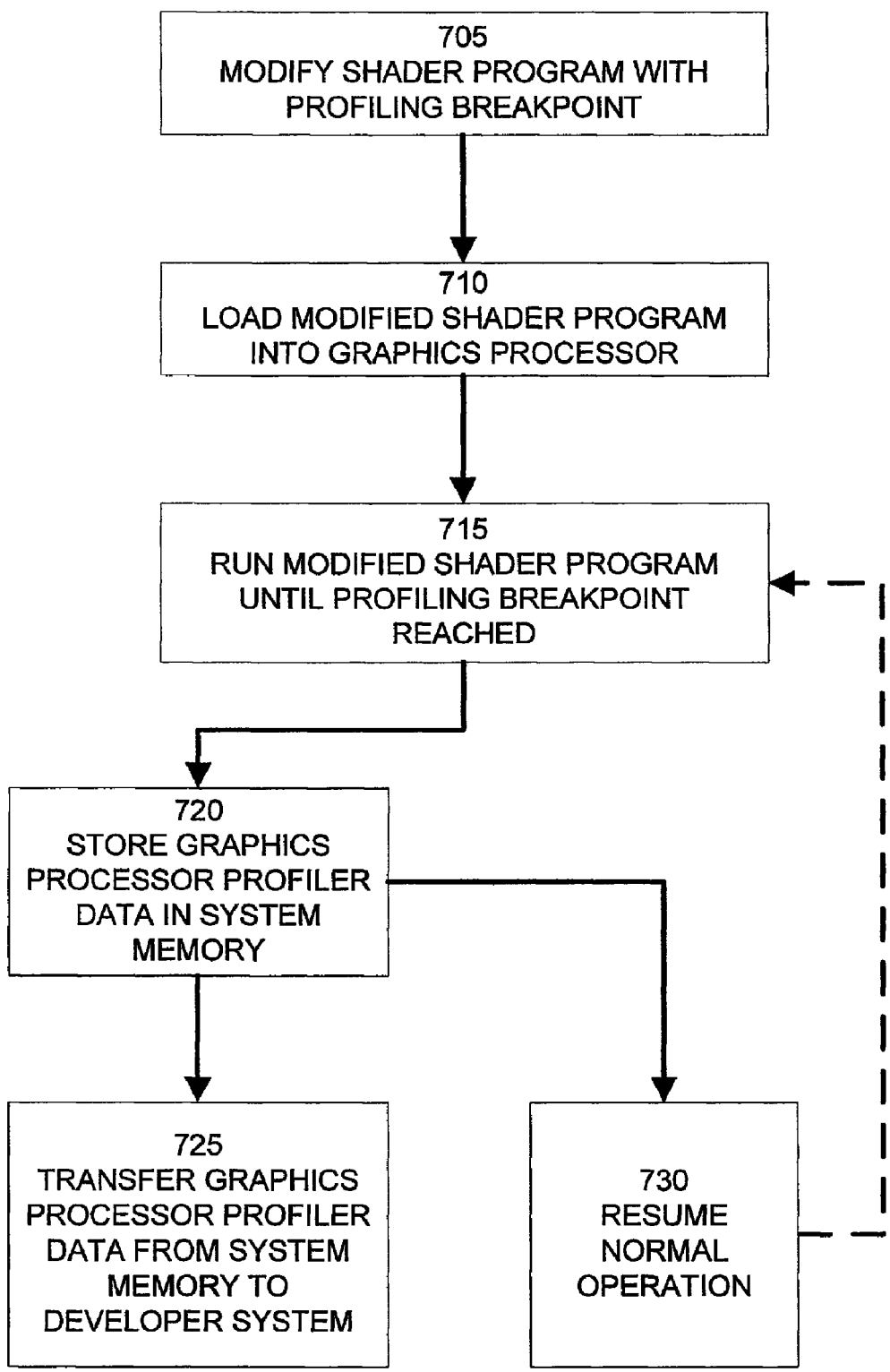
FIG. 7 illustrates a method of profiling the execution of shader programs in a graphics processing subsystem according to an embodiment of the invention.

FIG. 7 illustrates a method 700 of profiling the execution of shader programs in a graphics processing subsystem according to an embodiment of the invention. In profiling, the developer desires to gather and view statistics on shader program operation while the shader program is running. Examples of statistics can include the values of variables at specific points of the shader program and which portions of the shader program are executed most often. Method 700 is similar to method 300, except that in this embodiment, the shader program execution units do not stop after reaching breakpoints.

At step 705, a developer or other user selects one or more shader programs for analysis. In an embodiment, shader programs are selected for analysis using a development software application executed on a development system. The development system is in communication with a computer system that includes a graphics processing subsystem adapted to execute shader programs. In an embodiment, the developer also selects graphics processing subsystem state data to be monitored, such as one or more variables of the selected shader program, registers of a fragment processor, and/or memory locations. In a further embodiment, the developer sets one or more breakpoints, which are locations in the selected shader program in which the selected state data is to be made available during shader program execution.

In response to the selection of a shader program for analysis, the selection of state data, and the specification of one or more breakpoints, the selected shader program is modified by the development software application. In an embodiment, the development software application adds state output instructions, as discussed above, to the shader program. The state output instructions are adapted to instruct the shader execution unit to transfer copies of the selected state data out of the graphics processing subsystem. In an embodiment, the state output instructions, or a reference thereto, are located in the shader program at a location corresponding to the location of the specified breakpoint.

In another embodiment, the state output instructions includes an instruction for resuming normal execution of the shader program. This embodiment is useful for profiling, monitoring, or performance tuning applications. If any state data destroyed while being transferred out of the graphics processing subsystem, a set of state restoration instructions are further included to be executed prior to resuming normal execution of the shader program.

Once step 705 has modified one or more shader programs with state output instructions in accordance with the developer's specifications, step 710 loads the modified shader program into the graphics processing subsystem for execution. In an embodiment, step 710 loads the modified shader programs into the graphics processing subsystem in the same manner as that is used for normal unmodified shader programs. The technique used to load shader programs into the graphics processing subsystem for execution will vary depending upon the specific architecture of the computer system and the graphics processing subsystem; however, in general, any technique for transferring data between components of a computer system known to one of skill in the art can be used.

In step 715, the graphics processing subsystem executes one or more shader programs, including shader programs modified with state output instructions, in conjunction with rendering commands and data. In an embodiment, rendering commands and data are provided to the graphics processing subsystem by a CPU in the computer system executing an application program.

Upon reaching a breakpoint in a modified shader program, in step 720 the fragment processor or shader program execution unit executes the state output instructions included in the modified shader program. As a result, the shader program execution unit transfers a copy of the developer specified state data from its location within the graphics processing subsystem, such as from one or more data registers, stack locations, or memory locations, to an externally accessible location. In an embodiment, a copy of the state data is transferred from the graphics processing subsystem to the system memory of the computer system.

Following the output of state data to an externally accessible location, the computer system detects the presence of the copy of state data in this location. In an embodiment, the development software application specifies the address of the externally accessible location when modifying the shader program with state output instructions. The development system then monitors this address for changes to detect the presence of the state data from the graphics processing subsystem. In a further embodiment, the externally accessible location, such as the system memory of the computer system, is only accessible to the CPU and is not directly accessible by the development system. In this embodiment, the development software application modifies the application to be executed by the CPU so that the CPU monitors the address used to store a copy of the state data.

If the development system cannot access the copy of the state data directly, optional step 725 transfers the copy of the state data from its externally accessible location to the development system. In an embodiment, this is accomplished using the application executing on the CPU of the computer system. In this embodiment, the application executed by the CPU is modified by the development software application so that the CPU reads the state data from its externally accessible location and communicates it with the development system via a communications interface.

Simultaneously with step 725, step 730 resume normal operation of the shader program. In an embodiment, the shader program jumps to the next instruction following the breakpoint. In a further embodiment, step 730 executes state restoration instructions prior to this jump to restore any data values destroyed during step 720. In still a further embodiment, if any shader program instructions were deleted when the breakpoint was added to the shader program, then step 730 executes a copy of the deleted instructions. Following step 730, the method 700 returns to step 715 to execute the shader program until the same or a different breakpoint is reached.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of accessing state information of a graphics processing subsystem within a computer system, the method comprising:
    providing a shader program to the graphics processing subsystem, the shader program including at least one state output instruction;
    executing multiple concurrent instances of the shader program using a plurality of programmable execution units of the graphics processing subsystem;
    in response to the state output instruction in a first instance of one of the multiple concurrent instances of the shader program, halting the programmable execution unit executing the first instance and transferring the state information from the graphics processing subsystem;
    halting a second programmable execution unit of the graphics processing subsystem from executing a second instance of the shader program; and
    restarting the halted second programmable execution unit with the same second instance of the shader program, wherein the first instance is able to resume execution after the state information has been transferred without negatively impacting execution of the other multiple concurrent instances.

2. The method of claim 1, further comprising:
    halting the programmable execution unit executing the first instance before transferring the state information.

3. The method of claim 1, further comprising:
    halting the programmable execution unit executing the first instance before transferring the state information; and
    halting at least one additional programmable execution unit of the graphics processing subsystem in response to the state output instruction.

4. The method of claim 1, wherein the state information is stored in the graphics processing subsystem in one of a local register, a stack, and a local memory of the programmable execution unit executing the first instance of the shader program.

5. A method of updating state information of a graphics processing subsystem in a computer system using an external application, the graphics processing subsystem including a plurality of programmable execution units, the method comprising:
    modifying a shader program in the graphics processing subsystem to include at least one state output instruction;
    executing multiple concurrent instances of the modified shader program in parallel using the plurality of programmable execution units of the graphics processing subsystem; and
    in response to the state output instruction in a first instance of one of the multiple concurrent instances of the shader program:
        transferring the state information from the graphics processing subsystem;
        setting the state information of the graphics processing subsystem to at least one specified value;
        halting a second instance of one of the multiple concurrent instances of the shader program on a programmable execution unit;
        restarting same second instance of the shader program on the programmable execution unit; and
        resuming execution of the graphics processing subsystem using the at least one specified value of the state information.

6. The method of claim 5, further comprising:
    modifying the shader program to include at least one state restoration instruction, the at least one state restoration instruction designating the at least one specified value.

7. The method of claim 6, wherein the shader program is modified to include the at least one state output instruction and the at least one state restoration instruction using a development application.

8. The method of claim 7, wherein the development application is configured to dynamically modify the shader program in response to the transferred state information.

9. The method of claim 7, wherein the development application is configured to analyze the transferred state information for purposes of debugging the shader program.

10. The method of claim 6, wherein the at least one state output instruction and the at least one state restoration instruction are executable at any arbitrary location within the shader program.

11. A method of accessing state information of a graphics processing subsystem within a computer system, the method comprising:
    executing multiple concurrent instances of a shader program using a plurality of programmable execution units of the graphics processing subsystem, the shader program including at least one state output instruction; and
    in response to executing the state output instruction for a first instance of the multiple concurrent instances of the shader program:

halting execution of the first instance and at least one other concurrent instance of the shader program executing in parallel using the plurality of programmable execution units;

transferring the state information from the graphics processing subsystem;

modifying at least one of a set of rendering commands or a set of data associated with the at least one halted concurrent instance of the first shader program; and resuming execution of the at least one other concurrent instance of the shader program on its respective same programmable execution unit, wherein at least one geometric primitive to be processed by the at least one halted other concurrent instance is discarded when the graphics processing subsystem resumes execution.

12. The method of claim 11, further comprising:

prior to providing the shader program to the graphics processing subsystem, receiving an original shader program not including the at least one state output instruction; and modifying the original shader program to include the state output instruction.

13. The method of claim 11, wherein the state information corresponding to the executed state output instruction is stored in one of a local register, a stack, and a local memory of the programmable execution unit executing the first instance of the shader program.

14. The method of claim 11, further comprising:

modifying the shader program to include the at least one state output instruction using a development application.

15. The method of claim 14, wherein the state information is transferred from the graphics processing subsystem to a location accessible by the development application, the development application configured to profile execution of the shader program using the transferred state information.

16. A method of accessing state information of a graphics processing subsystem within a first computer system, the method comprising:

executing multiple concurrent instances of a shader program using a plurality of programmable execution units of the graphics processing subsystem, the shader program including at least one state output instruction; and in response to executing the state output instruction in a first instance of the multiple concurrent instances of the shader program:

halting execution of the first instance and all other concurrently executing instances of the shader program;

transferring the state information from the graphics processing subsystem;

modifying data to be processed by the halted other concurrently executing instances of the first shader program; and resuming execution of all other executing instances on their respective same programmable execution units, wherein a geometric primitive to be processed by each of the other concurrently executing instances is located outside a specified rendering area such that the at least one geometric primitive is clipped or discarded when the graphics processing subsystem resumes execution.

17. The method of claim 16, wherein modifying data to be processed comprises changing a value of a vertex of the geometric primitive to be processed by one of the other concurrently executing instances, such that the geometric primitive is positioned outside a clipping window of the specified rendering area.

18. The method of claim 16, wherein modifying data to be processed comprises changing a size of a clipping window of the specified rendering area such that the geometric primitive to be processed by each of the other concurrently executing instances is positioned outside the resized clipping window.

19. The method of claim 16, wherein the state information corresponding to the executed state output instruction is stored in one of a local register, a stack, and a local memory of the programmable execution unit executing the first instance of the shader program.

20. The method of claim 16, wherein the state information is transferred from the graphics processing subsystem to a location accessible by a development application, the development application configured to profile execution of the shader program using the transferred state information.

* * * * *